United States Patent
Tateno

(10) Patent No.: US 9,077,051 B2
(45) Date of Patent: Jul. 7, 2015

(54) SYSTEM FOR PREVENTING DETERIORATION OF STORAGE CAPACITY OF LEAD ACID BATTERY AND REUSING LEAD ACID BATTERY BY ELECTRICAL TREATMENT

(75) Inventor: Hiroto Tateno, Kagoshima (JP)

(73) Assignees: JSV CO., LTD., Kagoshima (JP); HIROTO TATENO, Kagoshima (JP)

( * ) Notice: Subject to any disclaimer, the term of this patent is extended or adjusted under 35 U.S.C. 154(b) by 496 days.

(21) Appl. No.: 13/578,085

(22) PCT Filed: Feb. 4, 2011

(86) PCT No.: PCT/JP2011/052336
§ 371 (c)(1),
(2), (4) Date: Sep. 6, 2012

(87) PCT Pub. No.: WO2011/102237
PCT Pub. Date: Aug. 25, 2011

(65) Prior Publication Data
US 2012/0326675 A1    Dec. 27, 2012

(30) Foreign Application Priority Data
Feb. 16, 2010   (JP) .................. 2010-031600

(51) Int. Cl.
*H01M 10/06* (2006.01)
*H01M 10/42* (2006.01)

(52) U.S. Cl.
CPC .......... *H01M 10/4242* (2013.01); *H01M 10/06* (2013.01); *Y02E 60/126* (2013.01)

(58) Field of Classification Search
CPC ............................. H01M 10/06; H01M 10/42
USPC ........................................................ 320/132
See application file for complete search history.

(56) References Cited

U.S. PATENT DOCUMENTS

2010/0117604 A1 * 5/2010 Zeier ............................ 320/166

FOREIGN PATENT DOCUMENTS

| JP | 55-111079 | 8/1980 |
|---|---|---|
| JP | 2000-040537 | 2/2000 |
| JP | 2000-156247 | 6/2000 |
| JP | 2000-323188 | 11/2000 |
| JP | 2002-334723 | 11/2002 |
| JP | 2004-079374 | 3/2004 |
| JP | 2006/244973 | 9/2006 |
| JP | 3902212 | 4/2007 |
| JP | 2009-176705 | 8/2009 |

* cited by examiner

Primary Examiner — Thuan Do

(57) ABSTRACT

A system for removing a layer of lead sulfate insulation crystals in which lead sulfate is selectively subjected to heating by dielectric relaxation loss at a peak frequency of lead sulfate dielectric relaxation loss of 10 MHz, thereby finely decomposing the crystals which have turned into poor conductors to oxidize positive electrodes of lead oxide and reduce negative electrodes of elemental lead by charging current.

6 Claims, 3 Drawing Sheets

F I G. 1
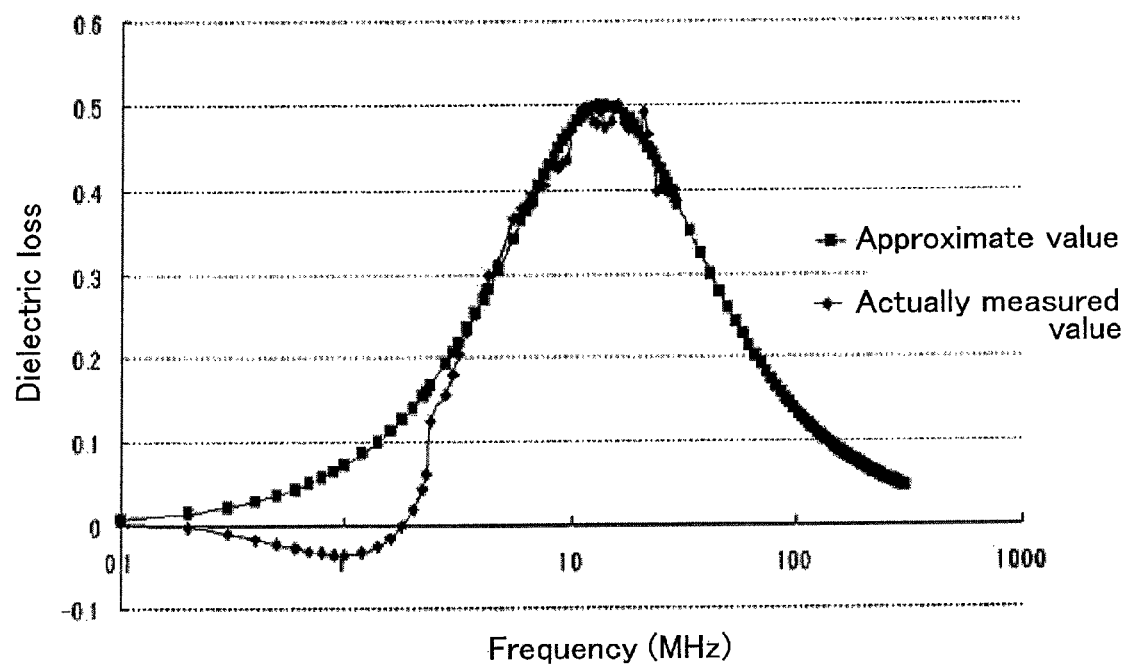

F I G. 2
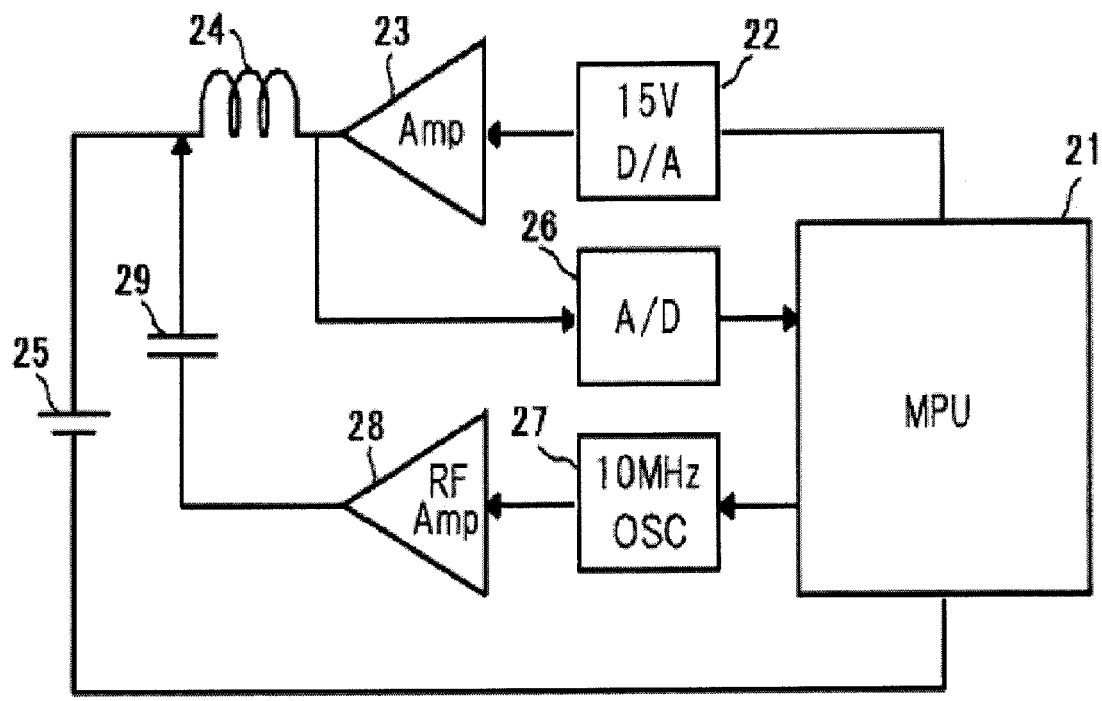

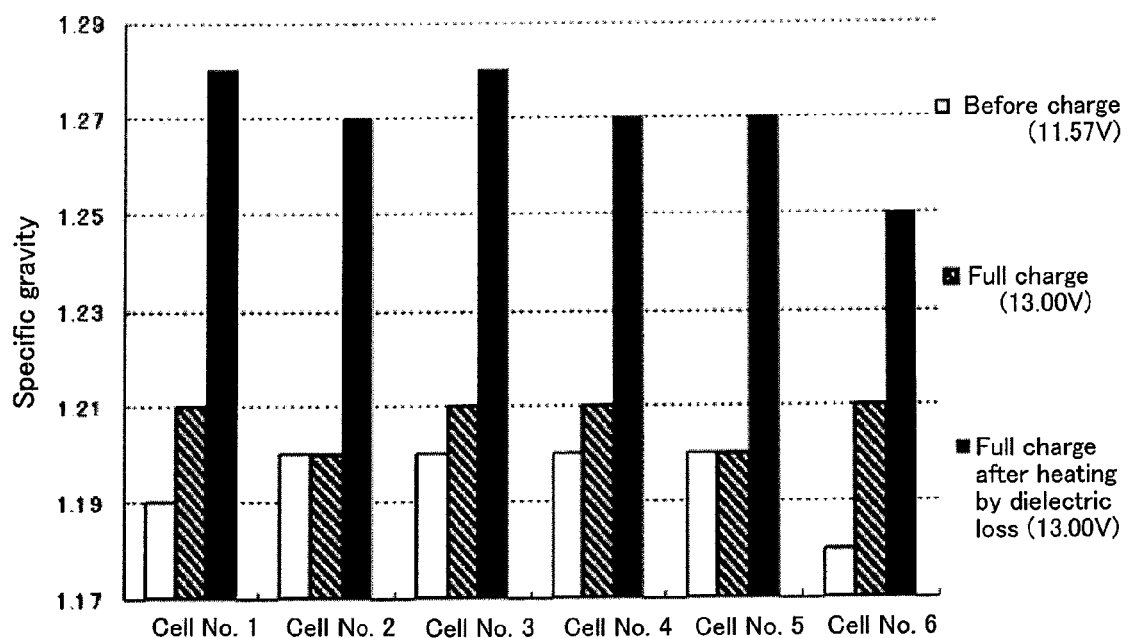
F I G. 3

SYSTEM FOR PREVENTING DETERIORATION OF STORAGE CAPACITY OF LEAD ACID BATTERY AND REUSING LEAD ACID BATTERY BY ELECTRICAL TREATMENT

BACKGROUND OF THE INVENTION

In order to prevent deterioration of storage capacity of a lead acid battery due to lead sulfate and reuse the lead acid battery, the present invention relates to a system for heating and pulverizing crystals of the lead sulfate which turn into poor conductors at a frequency of lead sulfate dielectric loss and chemically decomposing the crystals by charging current, thereby reusing the battery.

In a lead acid battery, an electrode surface of the battery is covered with a thin film of lead sulfate colloid which is a poor conductor due to an increase in the number of times the battery is discharged. The thin film of lead sulfate colloid crystallizes over time and crystallization of lead sulfate results in electrical insulation. Thus, positive electrodes of lead oxide are not oxidized or negative electrodes of elemental lead are not reduced on recharging, thus resulting in deterioration of storage capacity of the lead acid battery. Nowadays, in order to stabilize generation of electricity by utilizing unstable natural energies such as sunlight and wind power, it is indispensable to prolong the service life of a lead acid battery which is lower in price. In addition, it is necessary to provide technologies for preventing the deterioration of storage capacity due to lead sulfate and reusing the lead acid battery.

At present, as technologies for preventing the deterioration of storage capacity of a lead acid battery due to lead sulfate and reusing the lead acid battery, there is known a system in which pulse current is applied to the lead acid battery and an electric shock is imparted to a lead sulfate layer grown on an electrode surface to remove an insulation layer of the lead sulfate.

For example, Japanese Patent No. 3902212, Japanese Published Unexamined Patent Application No. 2000-156247, Japanese Published Unexamined Patent Application No. 2000-323188, Japanese Published Unexamined Patent Application No. 2006-244973, Japanese Published Unexamined Patent Application No. 2000-40537, and Japanese Published Unexamined Patent Application No. 2004-79374 commonly aim at the destruction of fine crystals of lead sulfate on the assumption that electrical and mechanical impulse waves are imparted at a high-voltage pulse of 1 MHz or lower. In this instance, the lead sulfate is considered to be more effectively removed at a higher voltage.

However, in the above instance, according to a method for destroying and removing the fine crystals of lead sulfate by using the electrical and mechanical impulse waves, electrical fields will not concentrate on a lead-sulfate crystal plane as an insulation face under the condition that electrode surfaces are insulated unevenly with the lead sulfate. Electric current will concentrate on a conductive electrode surface which is not covered with lead sulfate insulation and on which the electric current flows easily. Thereby, destruction by the electrical and mechanical impulse waves is less likely to take place.

The present invention has been made in view of the above problems, and an object thereof is to provide a system which allows electric current to concentrate on the surface of lead sulfate insulation through utilization of heating by lead sulfate dielectric relaxation loss in a MHz region, thereby selectively decomposing lead sulfate.

SUMMARY OF THE INVENTION

Heat generated by dielectric relaxation loss of lead sulfate insulation is used to thermomechanically distort crystals of lead sulfate, thereby forming fine cracks on the crystals to attain electrical conduction. Then, charging current is used to effect electrochemical decomposition, thereby forming lead oxide and elemental lead respectively at positive electrodes and negative electrodes. In the vicinity of 10 MHz which is a peak frequency of lead sulfate dielectric loss, electrical conductivity is small on an electrode surface which is not covered with the lead sulfate insulation. This is because the electrical conductivity on a metal electrode surface is mainly derived from ion diffusion current. And, since ion current is several dozen kHz or lower in response speed, the electrical conductivity on the metal electrode surface is small. At a MHz region, there is found a decrease in the polarization dielectric constant of a diluted sulfuric acid electrolyte. Therefore, at the MHz region, electric current will concentrate on the surface of a lead sulfate insulation film, the dielectric constant of which is higher than that of the diluted sulfuric acid electrolyte.

According to the present invention, a crystalline film of lead sulfate insulation is selected and finely decomposed thermomechanically. Therefore, a lead sulfate crystalline film can be decomposed through oxidization and reduction by low voltage and low current which is a high frequency of 2V peak-to-peak per cell. It is, thus, possible to reuse a lead acid battery without causing a short across electrodes resulting from thermal deformation of electrode plates due to conventional pulse regeneration by high voltage and high current.

BRIEF DESCRIPTION OF THE DRAWINGS

FIG. 1 is a drawing which shows characteristics with respect to frequency of dielectric loss current.

FIG. 2 is a block diagram which shows a brief constitution of a system for preventing deterioration of a lead acid battery and reusing the battery.

FIG. 3 is a drawing which shows regeneration of density of a sulfuric acid electrolyte for each of six cells by using a 12V lead acid battery as compared with regeneration by a conventional charging method.

DETAILED DESCRIPTION OF THE PREFERRED EMBODIMENTS

Hereinafter, a description will be given of one example as an embodiment of the present invention by referring to FIG. 1 to FIG. 3.

EXAMPLE 1

FIG. 1 shows characteristics of electric current actually measured from 0.1 MHz to 30 MHz across insulation electrodes by adding diluted sulfuric acid to lead sulfate powder in order to find out a frequency of lead sulfate dielectric loss. This figure also shows an approximate curve based on Formula (1) of Debye's relaxation equation. The measurement is in good agreement with an approximate formula. The result of FIG. 1 shows that dielectric loss peaks are distributed from 1 MHz to 100 MHz, with the peaks concentrated in the vicinity of 10 MHz. It is apparent that lead sulfate in a diluted sulfuric acid electrolyte is maximum in heating efficiency at this peak frequency of 10 MHz.

[Formula 1]

$$P = \frac{\omega \cdot \tau}{\{1 + (\omega \cdot \tau)^2\}} \qquad (1)$$

P: Dielectric loss
ω: External frequency
τ: Dipole time constant

FIG. 2 is a block diagram which shows a brief constitution of the system for preventing deterioration of a lead acid battery and reusing the battery in the present invention. As shown in FIG. 2, the system is composed of an MPU (micro-processing unit) 21 for controlling the system for reusing a lead acid battery, a D/A converter 22 for instructing charging voltage by the MPU 21, a charging voltage power amplifier 23, a high-frequency cutoff coil 24, a lead acid battery 25, an A/D converter 26 for measuring voltage of terminals of the lead acid battery, an oscillator 27 for instructing a frequency of lead sulfate dielectric loss, a lead sulfate dielectric loss frequency power amplifier 28 and a direct-current cutoff capacitor 29.

FIG. 2 exemplifies a 12V lead acid battery which is reused by an external power source.

This lead acid battery 25 is measured for voltage by using the A/D converter 26 and the voltage is input into the MPU 21. The MPU 21 turns into a battery reuse mode upon detection of no-load voltage of the lead acid battery 25 which is 13V or lower, generating a high-frequency alternating current of 10 MHz from the oscillator 27 for instructing a frequency of lead sulfate dielectric loss, amplifying the current by the high frequency power amplifier 28, thereby allowing a dielectric loss heating alternating current to flow into the lead acid battery 25 through the direct-current breaker 29. The MPU 21 amplifies the current from the D/A converter 22 by using the power amplifier 23 and starts charging at a voltage higher by approximately 2V than the no-load voltage of the lead acid battery 25 through the high-frequency breaker 24. The lead acid battery 25 is constantly measured for the voltage by using the A/D converter 26, and the MPU 21 uses the D/A converter 22 to guide-charge until the no-load voltage of the lead acid battery 25 reaches 13.5 V. Even after the no-load voltage has reached 13.5V, as floating charge, the MPU 21 uses the D/A converter 22 to conduct charge at a constant voltage of 14V, during which the MPU 21 also allows a high-frequency alternating current of 10 MHz to continuously flow into the lead acid battery 25.

In the above-described sequence of reusing the lead acid battery, in a method for removing a sulfuric acid layer of the lead acid battery according to claim 3, a continuous high-frequency current may be that in which the continuous high-frequency current is modulated intermittently for imparting an intermittent thermal shock.

Application of the high-frequency alternating current and charge according to claim 5 may be conducted alternately.

In FIG. 3, as an example, there is shown a 12V battery left unattended for one year to which a 10 MHz high-frequency current of 2V peak-to-peak for each cell was allowed to flow continuously and charge was conducted at the same time by using a constant-voltage power source having a direct current voltage of 15V and the battery was reused in 18 hours. The battery was charged by a conventional method and each cell was 1.20 or less in density. Out of six cells, two of these were reused completely at 100%. In a cell No. 6 showing the electrolyte density of 1.25, it is likely that crystals of lead sulfate dropped off from an electrode surface and no lead sulfate was involved in electrochemical decomposition, thereby concentrations of sulfuric acid on the cell No. 6 did not rise. The cell No. 6, the sulfuric acid concentrations of which did not rise, was given sulfuric acid until the density reached 1.28 and again charged and discharged, by which the cell was reused at 100%.

Lead acid batteries have been used extensively for starting engines of automobiles, marine vessels, etc., and also used as local storage stations of smart grids. These are also used in pulsation and rectification of wind turbine generators and solar batteries for utilization of natural energies. The present invention is capable of contributing to extended cycle life of the lead acid batteries and available accordingly.

DESCRIPTION OF REFERENCE NUMERALS

11 Experimental value of lead sulfate dielectric loss
12 Approximate curve based on Debye's relaxation equation
21 MPU (micro-processing unit) for controlling a system of reusing a lead acid battery
22 D/A converter for instructing charging voltage by an MPU
23 Charging voltage power amplifier
24 High-frequency cutoff coil
25 Lead acid battery
26 A/D converter for measuring voltage of terminals of a lead acid battery
27 Oscillator for instructing a frequency of lead sulfate dielectric loss
28 Lead sulfate dielectric loss frequency power amplifier
29 Direct-Current cutoff capacitor

What is claimed is:

1. A system for electrochemically removing a lead sulfate layer which is responsible for deterioration of storage capacity of a lead acid battery,
   the system comprising
      a voltage detector for measuring a voltage of a lead acid battery,
      a high frequency oscillator for generating a high-frequency alternating current when the voltage of said lead acid battery is at or lower than a prescribed value,
      a high frequency current amplifier for amplifying said high-frequency alternating current, and
      a direct-current breaker for letting said amplified high-frequency alternating current pass through and allowing a dielectric loss heating alternating current to flow into the lead acid battery,
   wherein
      a high-frequency alternating current at a frequency of dielectric loss associated with heat generated by dielectric loss is outputted to positive and negative electrodes of the lead acid battery to selectively decompose the lead sulfate layer, and
      the frequency of the high-frequency alternating current is operated at a frequency band of lead sulfate dielectric loss from 1 MHz to 100 MHz.

2. The system according to claim 1, wherein a lead acid battery to which the system is attached is utilized as a power source of the system.

3. The system according to claim 1, wherein a continuous high-frequency current is modulated for the purpose of stopping, since the continuous high-frequency alternating current imparts an intermittent thermal shock.

4. The system according to claim 1, wherein a direct-current charge is conducted together with application of a high-frequency alternating current, thereby reducing components of the lead sulfate layer which have been pulverized by decomposition resulting from dielectric loss.

5. The system according to claim 1, wherein alternate application of a high-frequency alternating current and charge is conducted, thereby subjecting components of the lead sulfate layer thermally-decomposed by dielectric loss to oxidization and reduction by charging current.

6. The system according to claim 1, wherein commercial power sources, natural energies, solar batteries, wind power generation and wave-power generation are utilized as a power source of the system, and electric power is stored.

* * * * *